United States Patent
Savoy et al.

(10) Patent No.: US 9,069,070 B2
(45) Date of Patent: Jun. 30, 2015

(54) SYSTEMS AND METHODS FOR THE SELECTION OF ANTENNAS IN AIRCRAFT NAVIGATION SYSTEMS

(75) Inventors: John Savoy, Olathe, KS (US); Sidney Richard Strong, Kenmore, WA (US); Alfonso Malaga, Sammamish, WA (US); Anthony H. Luk, Everett, WA (US)

(73) Assignee: Honeywell International Inc., Morristown, NJ (US)

( * ) Notice: Subject to any disclaimer, the term of this patent is extended or adjusted under 35 U.S.C. 154(b) by 599 days.

(21) Appl. No.: 13/486,616

(22) Filed: Jun. 1, 2012

(65) Prior Publication Data

US 2013/0321201 A1  Dec. 5, 2013

(51) Int. Cl.
| | |
|---|---|
| *G01S 19/47* | (2010.01) |
| *G01S 3/72* | (2006.01) |
| *G01S 19/25* | (2010.01) |
| *H01Q 3/24* | (2006.01) |
| *H04B 7/08* | (2006.01) |
| *H01Q 1/28* | (2006.01) |

(52) U.S. Cl.
CPC . *G01S 19/25* (2013.01); *G01S 3/72* (2013.01); *H01Q 1/28* (2013.01); *H01Q 3/24* (2013.01); *H04B 7/0817* (2013.01); *H04B 7/0834* (2013.01); *H04B 7/088* (2013.01)

(58) Field of Classification Search
USPC ............................ 342/357.3, 357.395, 357.49
See application file for complete search history.

(56) References Cited

U.S. PATENT DOCUMENTS

| | | | |
|---|---|---|---|
| 1,926,616 | A | 9/1933 | Eaton |
| 3,368,151 | A | 2/1968 | Verwey et al. |
| 3,475,686 | A | 10/1969 | Holt, Jr. et al. |
| 3,671,967 | A | 6/1972 | Fries |
| 4,134,118 | A | 1/1979 | Corbett |
| 4,392,139 | A | 7/1983 | Aoyama et al. |

(Continued)

FOREIGN PATENT DOCUMENTS

| | | |
|---|---|---|
| EP | 1630978 | 1/2006 |
| EP | 2323216 | 5/2011 |
| RU | 2197065 C2 * | 1/2003 |

OTHER PUBLICATIONS

Cheng et al., "Transmit Antenna Selection Based on Link-Layer Channel Probing", 2007, pp. 1-6, Publisher: IEEE.

(Continued)

*Primary Examiner* — Harry Liu
(74) *Attorney, Agent, or Firm* — Fogg & Powers LLC

(57) ABSTRACT

Systems and methods for the selection of antennas in aircraft navigation systems are provided. In one embodiment, a navigation receiver system for an aircraft comprises: a first aircraft antenna that receives transmitter signals from fixed-location ground transmitters and a second aircraft antenna that receives transmitter signals from the fixed-location ground transmitters, wherein the first aircraft antenna has a first gain pattern that is different from a second gain pattern of the second aircraft antenna; a switch coupled to a first receiver and the first and second aircraft antenna; and a switch controller coupled to the switch. The switch controller operates the switch to electrically couple the first receiver to either the first or second aircraft antenna based on a determination of whether the first gain pattern or the second gain pattern provides higher gain in a direction of a first fixed-location ground transmitter of the fixed-location ground transmitters.

18 Claims, 7 Drawing Sheets

(56) References Cited

U.S. PATENT DOCUMENTS

| | | | |
|---|---|---|---|
| 4,723,126 | A | 2/1988 | Chisholm |
| 4,837,580 | A | 6/1989 | Frazita |
| 4,894,655 | A | 1/1990 | Joguet et al. |
| 4,912,479 | A | 3/1990 | Nishimura et al. |
| 5,010,343 | A | 4/1991 | Andersson |
| 5,014,067 | A | 5/1991 | Chisholm |
| 5,786,773 | A | 7/1998 | Murphy |
| 6,072,994 | A | 6/2000 | Phillips |
| 6,121,925 | A | 9/2000 | Hilliard |
| 6,804,515 | B1 * | 10/2004 | McCraw et al. ............... 455/431 |
| 7,019,708 | B2 | 3/2006 | Regala |
| 7,071,791 | B1 | 7/2006 | Wilson, III |
| 7,161,527 | B2 | 1/2007 | Vacanti |
| 7,218,278 | B1 | 5/2007 | Arethens |
| 7,660,559 | B2 | 2/2010 | Herscovich et al. |
| 7,920,860 | B2 * | 4/2011 | Chari et al. ................... 455/431 |
| 8,000,648 | B2 * | 8/2011 | Yoshida et al. ................... 455/7 |
| 8,547,277 | B1 * | 10/2013 | Mitchell ........................ 342/367 |
| 2007/0087788 | A1 | 4/2007 | Herscovich et al. |
| 2008/0240062 | A1 | 10/2008 | Lynch et al. |
| 2009/0282469 | A1 | 11/2009 | Lynch et al. |
| 2011/0231038 | A1 | 9/2011 | Studenny et al. |
| 2011/0313600 | A1 * | 12/2011 | Davis et al. ...................... 701/16 |
| 2012/0056784 | A1 | 3/2012 | Xie et al. |

OTHER PUBLICATIONS

Per Enge, "Local Area Augmentation of GPS for the Precision Approach of Aircraft", "Proceedings of the IEEE", Jan. 1999, pp. 111-132, vol. 87, No. 1, Publisher: IEEE.

"GBAS Demonstrator", Feb. 25, 2009, pp. 1-2, Publisher: Deutsches Zentrum Fur Luft- und Raumfahrt.

"The 14th IEEE 2003 International Symposium on Personal, Indoor and Mobile Radio Communications Proceedings", Sep. 2003, pp. 1-45.

"Enhanced Space Integrated GPS/INS", Jan. 2006, pp. 1-2, Publisher: Honeywell Defense & Space.

"Into the Blue Issue 13", 2010, pp. 1-20, Publisher: Honeywell.

Lari et al., "Cross layer transmit antenna selection in MQAM modulation MIMO systems (Abstract)", Dec. 2010, pp. 1-2.

"Honeywell Flight Controls Help Ensure Smooth Ride for Boeing 787 Air Show Debut", "Jul. 21, 2010 Press Release", Jul. 21, 2010, pp. 1-2, Publisher: Honeywell.

Wang et al., "Handheld DVB-T Digital TV with an Automatic Antenna Selection Method for Mobile Reception (Abstract)", Jan. 2007, pp. 1-2.

"Automatic Antenna Selection", "http://www.remoterig.com/wp1216/?page_id=335 accessed Jan. 9, 2012", 2011, pp. 1-17, Publisher: WebSwitch.

European Patent Office, "European Office Action", "from Foreign Counterpart of U.S. Appl. No. 13/486,616", Oct. 10, 2013, pp. 1-7, Published in: EP.

European Patent Office, "European Search Report", "from Foreign Counterpart of U.S. Appl. No. 13/486,616", Sep. 26, 2013, pp. 1-3, Published in: EP.

European Patent Office, "Office Action from EP Application No. 13166322.1 mailed Oct. 24, 2014", "from Foreign Counterpart of U.S. Appl. No. 13/486,616", Oct. 24, 2014, pp. 1-7, Published in: EP.

* cited by examiner

SYSTEMS AND METHODS FOR THE SELECTION OF ANTENNAS IN AIRCRAFT NAVIGATION SYSTEMS

BACKGROUND

Navigation instruments are often used to guide aircraft, including unmanned air vehicles, especially during the more difficult maneuvers such as landing, takeoff and emergency situations. These instruments may be used with an Instrument Landing System (ILS) that is ground-based at the ground control station and runway and help guide an aircraft to approach and land, using a combination of radio (RF) signals and perhaps high-intensity light beams. The ground control station transmits the RF signals that are received by an aircraft's antennas and receiver electronics connected to the antenna. Ideally, signals are received on the aircraft using an antenna with an omnidirectional gain pattern.

However, the design or location of the antennas may be such that they cannot receive signals omnidirectionally. Also, an aircraft's electrically-conductive body or frame can partially obstruct, distort or reflect electromagnetic signals from certain directions. For example, an ILS localizer antenna located near the nose of an aircraft may receive signals well in the forward direction but have limitations when receiving signals from the aft. By contrast, a very high frequency (VHF) omnidirectional radio range (VOR) antenna located on the back tail of an aircraft may have a blind spot in receiving signals from the forward direction. Ideally, it is desired to maintain contact with a ground control station regardless of the orientation of the aircraft. However, because a ground control station may be located in an arbitrary location with respect to an aircraft, the particular antenna on the aircraft used for receiving ground control station signals will not always be optimally oriented to receive those signals as the aircraft maneuvers. Consequently, there is a need in the art for improved systems and methods for managing aircraft navigation communication.

SUMMARY

Systems and methods for the selection of antennas in aircraft navigation systems are provided. In one embodiment, a navigation receiver system for an aircraft comprises: a first aircraft antenna that receives transmitter signals from fixed-location ground transmitters and a second aircraft antenna that receives transmitter signals from the fixed-location ground transmitters, wherein the first aircraft antenna has a first gain pattern that is different from a second gain pattern of the second aircraft antenna; a switch coupled to a first receiver and the first and second aircraft antenna; and a switch controller coupled to the switch. The switch controller operates the switch to electrically couple the first receiver to either the first or second aircraft antenna based on a determination of whether the first gain pattern or the second gain pattern provides higher gain in a direction of a first fixed-location ground transmitter of the fixed-location ground transmitters.

DRAWINGS

The following exemplary figures are intended to aid the understanding of the written description of the exemplary embodiments and should not be considered limiting in scope.

FIG. 1 is a block diagram illustrating one embodiment of an antenna selector;

FIGS. 2A-C illustrate embodiments of the antenna selector in operation;

Figure 1:
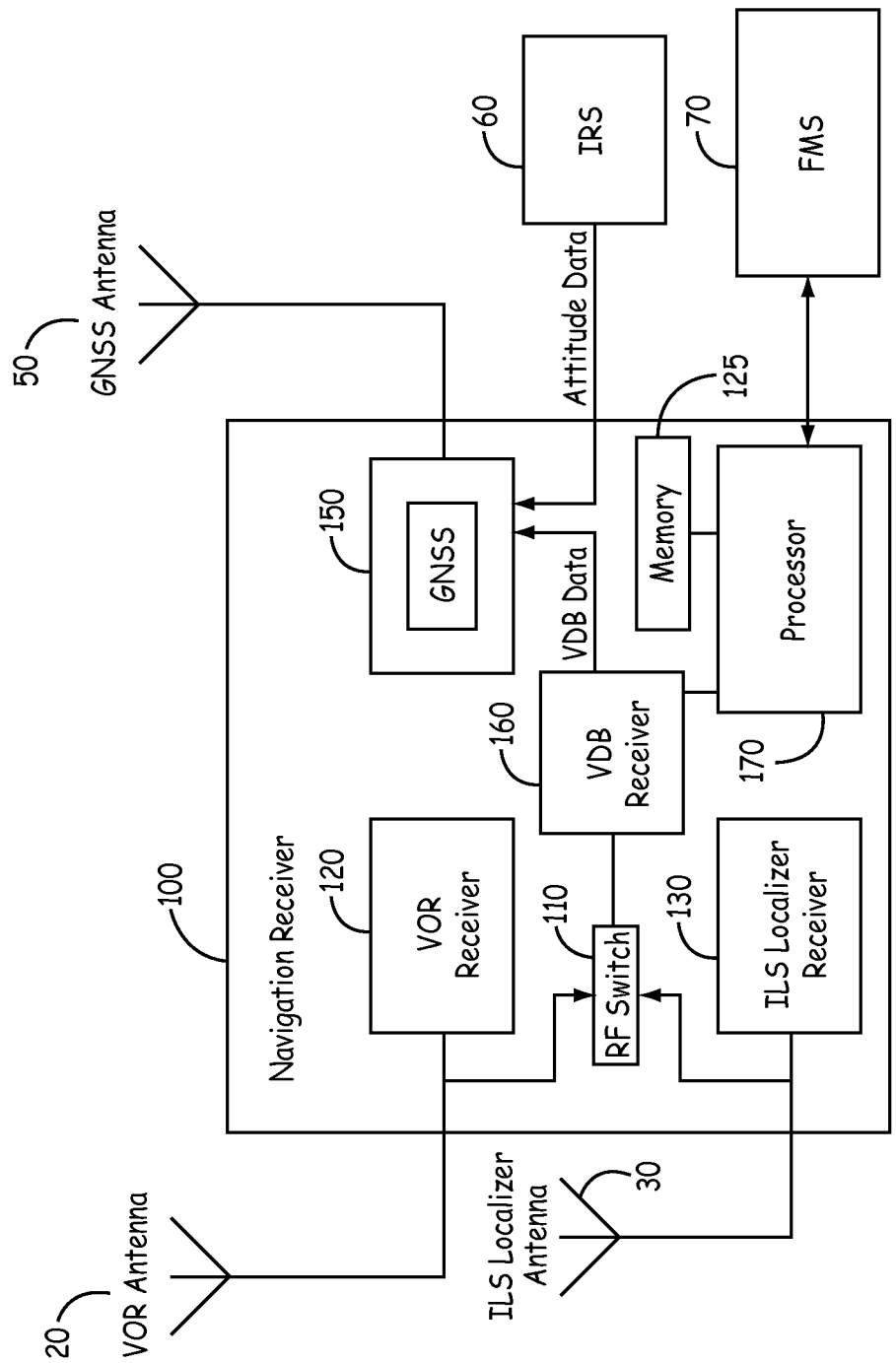

In accordance with common practice, the various displayed features are not necessarily drawn to scale but are drawn to emphasize specific features relevant to the exemplary embodiments.

DETAILED DESCRIPTION

In the following description, reference is made to the accompanying drawings and specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following description is, therefore, not to be taken in a limiting sense.

Embodiments of the present invention increase the probability of successfully conducting a desired maneuver even when a ground control station is located in an arbitrary location. The systems and methods described herein provide a cost-effective, compact, fast, automated, easy to use and install that is able to function under different protocols such as, but not limited to, a GLS system (GPS Landing System), a Ground-Based Augmentation System (GBAS), or a GBAS-based GLS that augments GPS (Global Positioning Satellite) systems used for navigation.

Embodiments described in the present disclosure utilize gain characteristics of various antennas aboard an aircraft in conjunction with the current aircraft location and attitude and a location of a ground transmitter to dynamically choose which of the various antennas to use to communicate with the ground transmitter. For example, in one embodiment, an aircraft's flight management system (FMS) may use GPS location data from a GPS receiver and attitude data from an inertial reference system (IRS) to determine the aircraft location and orientation in space. With this information, systems on the aircraft then look up the location of a particular ground-based navigation aid from a database and establish a line-of-sight directional vector between the aircraft and the ground-based navigation aid. With knowledge of the directional gain characteristics for each of the aircraft's various antennas, each antenna would then be evaluated based on its directional gain characteristics to determine the best antenna for receiving a signal from the ground station. Evaluation of the antenna selection may be performed based on the current position, attitude and velocity of the aircraft, and optionally, as well as those values predicted to exist in the future. The antenna selector then chooses the antenna that has the best performance. Optionally, to minimize impact on operation, switching from one antenna to another would occur only in a time interval when no data is expected from the ground based navigation aid.

FIG. 1 is a block diagram illustrating an on-board navigation receiver 100 of one embodiment of an antenna selector. In the particular embodiment shown in FIG. 1, navigation receiver 100 comprises a VHF omnidirectional radio range (VOR) receiver 120 coupled to a VOR antenna 20, an instrumentation landing system (ILS) localizer receiver 130 coupled to an ILS localizer antenna 30, and a VHF Data Broadcast (VDB) receiver 160 coupled to both VOR antenna 20 and ILS antenna 30 via an RF switch 110. In other words, the navigation signals utilized by VDB receiver 160 are compatible with the VHF antenna characteristics of both the VOR antenna 20 and the LOC antenna 30. In one embodiment, the VDB receiver is compatible with the GBAS and ILS navigation protocol systems.

Navigation receiver 100 further comprises a GPS receiver 150 coupled to a GPS antenna 50. In the particular implementations shown in FIG. 1, navigation receiver 100 integrates VOR, ILS and VDB functions in a single component. In other embodiments, as described below, one or more of the elements or functions attributed to navigation receiver 100 is distributed across various distinct components. An inertial reference system (IRS) 60 is also coupled to navigation receiver 100 that provides aircraft attitude data to navigation receiver 100. In one embodiment, IRS 60 comprises sets of accelerometers and gyroscopes that track changes in position and attitude.

In operation, in one embodiment, VDB receiver 160 will operate switch 110 to select between receiving a navigation signal from a GBAS ground station via VOR antenna 20 and ILS localizer antenna 30. This selection is performed dynamically in response to changes in the aircrafts position, velocity and attitude to ensure that VDB receiver 160 is receiving the navigation signal via the antenna having the best antenna gain for the circumstances.

The operation of navigation receiver 100 is further illustrated by reference to FIGS. 2A and 2B. These figures depict an aircraft 10 having a navigation receiver 100 as described with respect to FIG. 1. VOR antennas 20 are often mounted near the top, rear of the plane 10 so that there may not be a direct line-of-sight between the ground transmitters and the VOR antenna 20. The ILS localizer antenna 30 is often mounted in the nose of the plane resulting in a directional reception gain pattern with little gain towards the back of the plane. Due to this combination of geometry, placement and antenna design, the antennas 20 and 30 will have certain reception gain patterns associated with them.

Figure 2A:
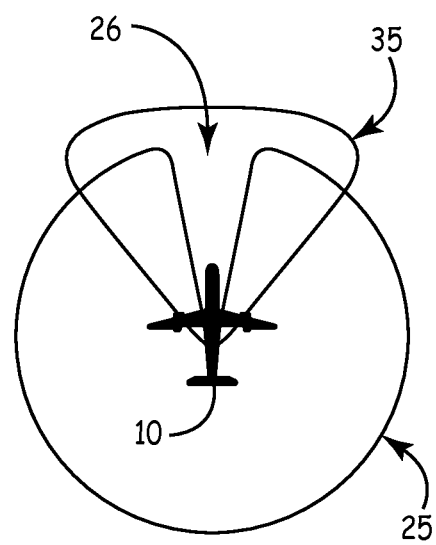
Figure 2B:
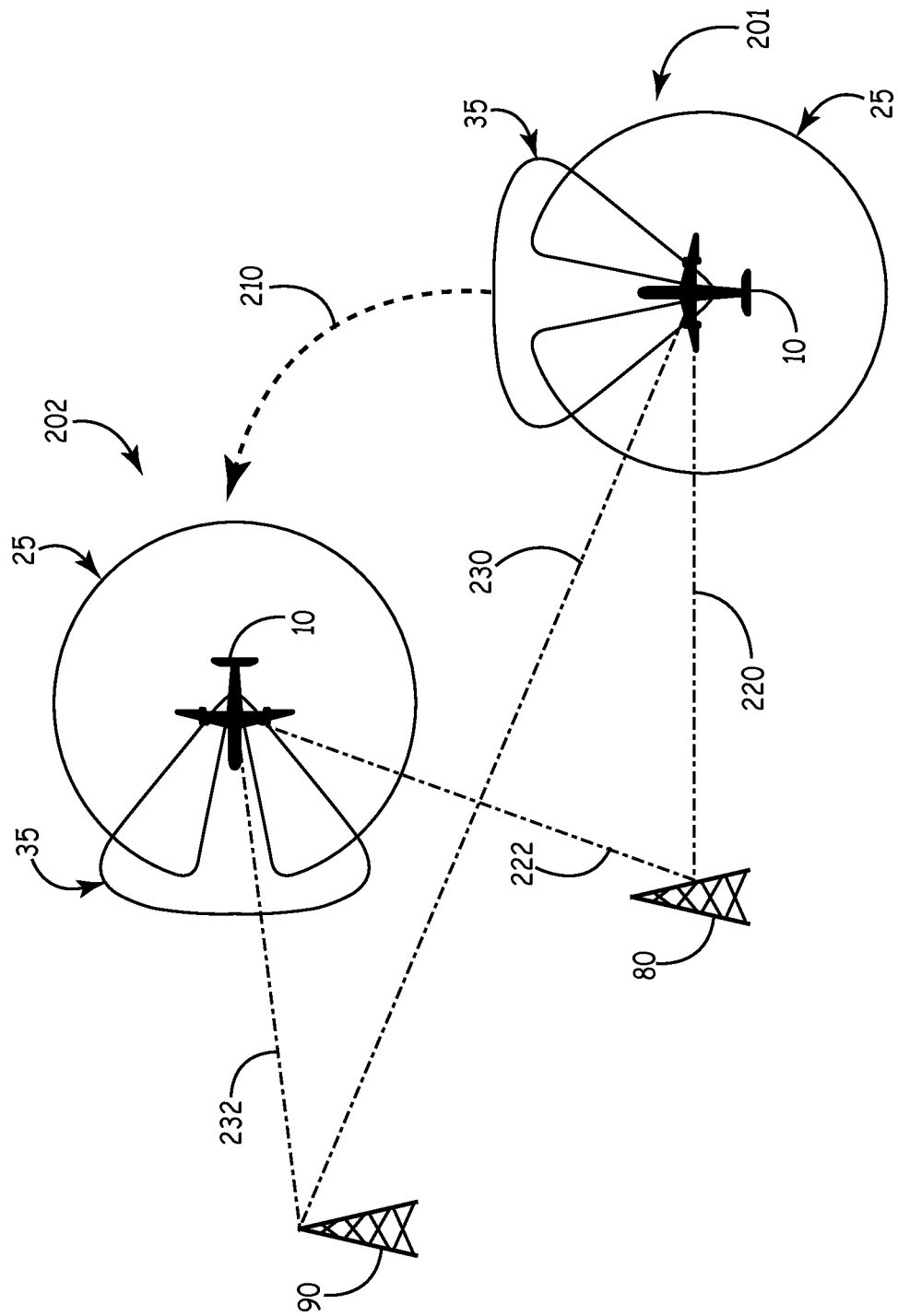

In FIGS. 2A and 2B, antenna pattern 35 illustrates the approximate reception gain pattern of ILS localizer antenna 30. Because an ILS localizer receiver 130 is predominantly utilized to guide and align an aircraft with an airport's runway, ILS localizer antenna 30 is arranged such that its directional reception gain pattern 35 has maximum signal reception gain in the forward direction of aircraft 10. Antenna pattern 25 illustrates the approximate reception gain pattern of VOR antenna 20. Although the VOR antenna 20 is a generally omnidirectional antenna, as shown in FIG. 2A, the shape of antenna pattern 25 includes a null region 26 in the forward direction for aircraft 10. The null region 26 may be due to structural interference with signal reception which may be due to where the VOR antenna is mounted, for example. These antenna gain patterns 25 and 35 are mapped with respect to the body reference frame of aircraft 10. That is, as aircraft 10 changes in position or with respect to roll, pitch and yaw, the antenna gain patterns follow the body reference frame of aircraft 10. This gain pattern is stored in an on-board aircraft database (such as in memory 125 as discussed further below) to be used by navigation 100 in the antenna selection. It would be appreciated by one of ordinary skill in the art after studying this disclosure that antenna patterns 25 and 35 are illustrations representing 3-dimensional antenna patterns.

FIG. 2B illustrates the operation of navigation receiver 100 interacting with ground station transmitters 80 and 90 as aircraft 10 travels along flight path 210. In one embodiment, transmitters 80 and 90 are GBAS ground station transmitters that are fixed at known locations. GBAS is a navigation aid for aircraft that augments Global Navigation Satellite Systems (GNSS) navigation services (GPS or Europe's Galileo, for example) and provides enhanced levels of safety and expanded navigation service. GBAS can potentially support all phases of approach, takeoff, landing, and surface operations within a fixed radius of a GBAS equipped airport. The VHF signals transmitted from ground station transmitters 80 and 90 are compatible with reception by both the VOR antenna 20 and the ILS localizer antenna 30 aboard aircraft 10.

Turning attention first to receiving navigation signals from ground station transmitter 80, when aircraft 10 is at position 201, navigation receiver 100 has a line-of-sight path 220 to ground station transmitter 80 (which may be thought of as a directional vector) that passes through antenna pattern 25 but not antenna pattern 35. As such, at position 201, navigation receiver 100 sets switch 110 so that VDB receiver 160 receives navigation signals from ground station transmitter 80 via VOR antenna 20. As aircraft 10 performs the maneuver shown at 210 to arrive at position 202, the new line-of-sight path 222 to ground station transmitter 80 still passes through antenna pattern 25 but not antenna pattern 35. As such, at position 202, navigation receiver 100 maintains switch 110 so that VDB receiver 160 receives navigation signals from ground station transmitter 80 via VOR antenna 20.

Turning attention next to receiving navigation signals from ground station transmitter 90, when aircraft 10 is at position 201, navigation receiver 100 has a line-of-sight path 230 to ground station transmitter 80 that passes through antenna pattern 25 but not antenna pattern 35. As such, at position 201, navigation receiver 100 sets switch 110 so that VDB receiver 160 receives navigation signals from ground station transmitter 90 via VOR antenna 20. As aircraft 10 performs the maneuver shown at 210 to arrive at position 202, the new line-of-sight path 232 to ground station transmitter 90 no longer passes through antenna pattern 25 but instead passes through the low gain null region 26 for antenna pattern 25. However, as shown in FIG. 2B, the new line-of-sight path 232 to ground station transmitter 90 now passes through antenna pattern 35. As such, navigation receiver 100 sets switch 110 so that VDB receiver 160 receives navigation signals from ground station transmitter 90 via ILS localizer antenna 30.

In one embodiment, in order to determine line-of-sight paths between aircraft 10 and ground station transmitter 90 (for example), navigation receiver 100 determines a vector from the aircraft 10 to ground station transmitter 90. Based on where that vector appears with respect to the mapping of the onboard antenna gain patterns 25, 35, navigation receiver 100 operates switch 110 to select the antenna that is best suited (that is, has the higher gain) for receiving signals from the ground station transmitter 90. In one embodiment, the mapping of onboard antenna gain patterns 25, 35 is stored in a memory 125 within navigation receiver 100. In addition, the coordinates of ground station transmitter 90 are provided in a transmission by ground station transmitter 90. In another embodiment, navigation receiver 100 accesses an on-board database stored in memory 125 that stores records that provide coordinates for ground station transmitter 90 as well as a plurality of other ground station transmitters that may be encountered by aircraft 10.

In order to determine the position and orientation of aircraft 10, GPS receiver 150 provides coordinates for the aircraft 10 while inertial reference system 60 provides the roll, pitch and yaw of aircraft 10. In one implementation, the coordinates for ground station transmitter 90 and coordinates for the aircraft 10 will typically be communicated with respect to an Earth based navigation reference frame while the roll, pitch and yaw of aircraft 10 information from inertial reference system 60 are provided with respect to an inertial reference frame. Meanwhile, the three-dimensional antenna patterns 25 and 35 are defined with respect to the body reference frame of aircraft 10. As such in one embodiment, the three dimensional direction vector pointing from aircraft 10 to ground station transmitter 90 is calculated using the known position of ground station transmitter 90 and data from GPS receiver 150 and then mapped to aircraft 10's body reference frame using attitude information from inertial reference system 60. Once the three-dimensional directional vector is mapped to aircraft 10's body reference frame, determining which antenna pattern (i.e., 25 or 35) that the direction vector passes through is calculated by navigation receiver 100. The mathematics for such coordinate mapping are readily within the skill of one of ordinary skill once the teachings of this disclosure have been read and understood. For example, in one implementation an aircraft's three-dimensional trajectory is mapped onto the two-dimensional plane the aircraft's body and a gain metric is determined in this plane.

Figure 2C:
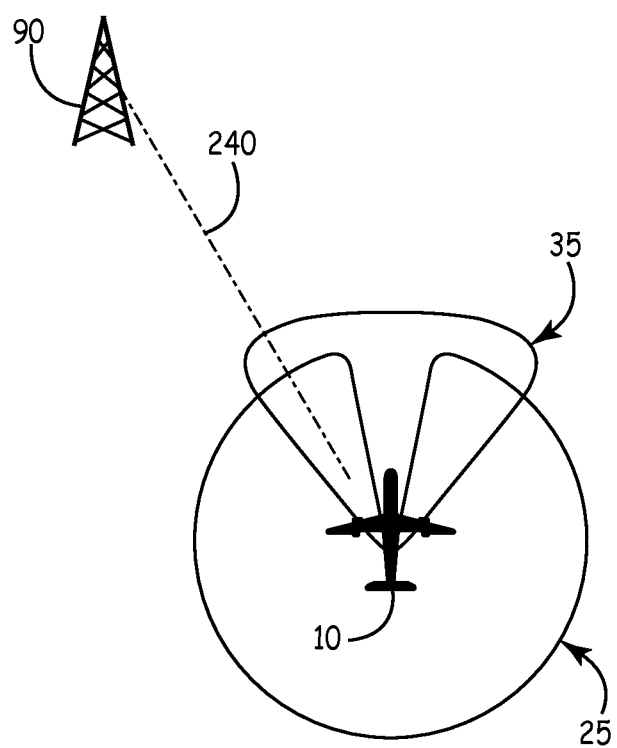

In one embodiment in operation, navigation receiver 100 may determine a directional vector (shown by line 240) that passes through both antenna patterns 25 and 35 such as shown in FIG. 2C. In one embodiment, navigation receiver 100 will resolve this situation by selecting the antenna pattern having the greatest gain in the direction of the vector 240. In another embodiment, navigation receiver 100 utilizes a priori knowledge regarding aircraft 10's projected trajectory and future flight maneuvers to select between antenna pattern 25 or 35. For example, in one embodiment, navigation receiver 100 is coupled to aircraft 10's flight management system 70, which tracks, plans and projects the flight path traveled by aircraft 10. When aircraft 10 in FIG. 2C is projected to maintain its present course but then turn away from ground station transmitter 90, navigation receiver 100 will select antenna pattern 25 because that selection will establish a connection suitable for both current and projected future conditions. Similarly, when aircraft 10 in FIG. 2C is projected to turn towards ground station transmitter 90, navigation receiver 100 will select antenna pattern 35 because that selection will establish a connection with higher gain that is suitable for both current and projected future conditions.

As another example of operation, returning to FIG. 2B, in one embodiment, aircraft 10 at position 210 has a priori knowledge of a maneuver that will be performed to take flight path 210. Accordingly, navigation receiver 100 will predict vector 232 based on where it expects aircraft 10 to be in the future with respect to position and attitude and preemptively switch from the VOR antenna 20 to LOC antenna 30 at a point in time where it expects vector 232 to enter antenna pattern 35.

In one embodiment, in order to perform the various calculations and predictions described with respect to FIG. 2, navigation receiver 100 further comprises a processor 170 that optionally couples to flight management system 70. In one embodiment, processor 170 comprises a processor unit that includes some digital signal processing functionalities. In one embodiment, the processor 170 is an individual module within navigation receiver 100. In other embodiments, processor 170 is integrated with other modules such as GPS receiver 150 and/or VDB receiver 160. In one embodiment, knowledge regarding upcoming flight maneuvers is obtained by processor 170 through instructions received by VDB receiver 160 from a ground station transmitter. In other embodiments, knowledge regarding upcoming flight maneuvers is obtained by processor 170 from the flight management system 70. For example, in one embodiment, flight management system 70 communicates to processor 170 pilot instructions regarding speed and course of navigation, holding patterns, airport configurations and the like. Navigation receiver 100 receives this information from the flight management system 70 so that processor 170 knows the trajectory a priori and can calculate the necessary vectors and select the best antenna for the aircraft over some future interval of time, such as over the next 5 to 10 minutes of travel. This embodiment is desirable when the present aircraft position is quite different from the subsequent direction, e.g. when it is necessary to make a sharp turn.

In the embodiment of FIG. 1, switching occurs when RF switch 110 receives a decision from the VDB receiver 160. In an alternative embodiment, RF switch 110 receives a decision directly from processor 170 to switch from one antenna signal to the other. In one embodiment, the act of switching is performed to avoid the occurrence of dead time (i.e., which may occur when electronics are transitioning from one antenna to another) while a navigation signal is either being received or expected. An overly-long dead time could mean a loss of important communication with the ground station. As such, the decision of when to switch should account for the characteristics of the signal transmitted by the ground station transmitter to navigation receiver 100, and the actual switching time in navigation receiver 100. In one embodiment, transmissions from ground station transmitter 90 are scheduled in a time division manner so that navigation information is transmitted only during predetermined scheduled time slots. In this embodiment, processor 170 coordinates switching of RF switch 210 to occur during the time slots when navigation information is not scheduled.

Figure 3:
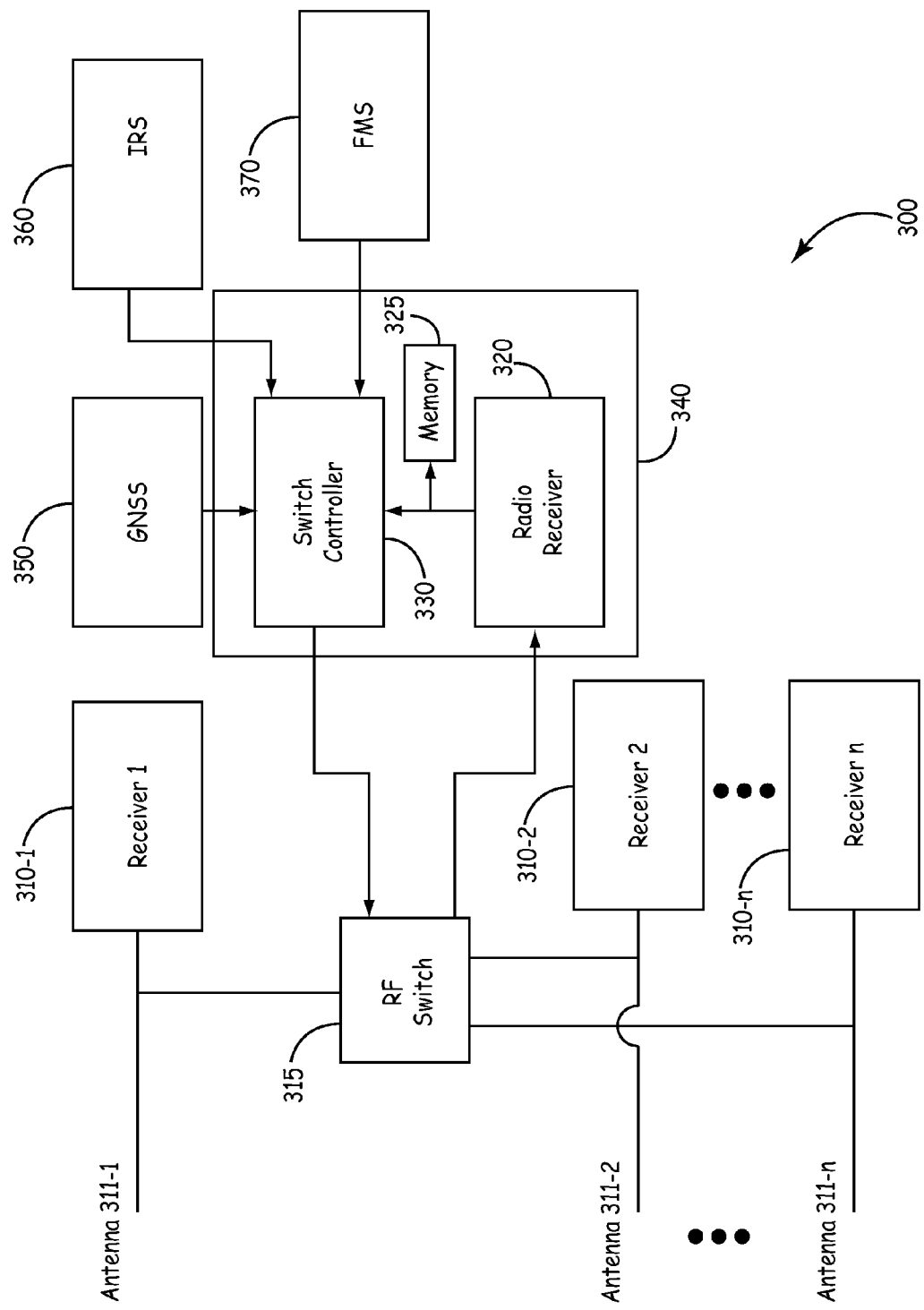
FIG. 3 is a block diagram illustrating another embodiment of an antenna selector.

FIG. 3 is a block diagram of another navigation receiver 300 of one embodiment of an antenna selector for use on aircraft 10. Navigation system 300 comprises a plurality of radio receivers 310-1 to 310-*n* each coupled to respective antennas 311-1 to 311-*n*. Navigation system 300 further comprises a Radio receiver 320 that is selectively coupled to one of antennas 311-1 to 311-*n* via an RF switch 310. Radio receiver 320 is configurable to operate as a GBAS VDB receiver such as VDB receiver 160 described above. Alternatively, Radio receiver 320 is re-configurable to operate at other frequencies by adjusting the circuit bandwidth or software coefficients of the receiver 320. RF switch 315 is operated by a switch controller 330, which in one embodiment is a processor or other programmable element. In alternate implementations, radio receiver 320 and switch controller 330 may optionally be either separate components or implemented as an integrated processing component 340. Antennas 311-1 to 311-*n* comprise a plurality of antennas each having frequency characteristics compatible for use with the frequency-adjustable radio receiver 320. In one embodiment, one or more of antennas 311-1 to 311-*n* are also utilized for other radio frequency systems such as VOR and ILS. As such, one or more of antennas 311-1 to 311-*n* can be expected to have dissimilar gain and directional patterns from each other, such as antennas 20 and 30 discussed above.

In operation, in one embodiment, navigation system 300 determines which antenna 311-1 to 311-*n* should be connected to radio receiver 320 based on current and/or projected position and attitude of aircraft 10 as well as the particular antenna gain patterns associated with each of the antenna 311-1 to 311-*n*. This selection is performed dynamically in response to changes in the aircraft's position, velocity and attitude to ensure that radio receiver 320 is receiving a GBAS navigation signal from a ground station via the antenna having the best antenna gain for the circumstances as described above with respect to FIGS. 1 and 2.

In the embodiment shown in FIG. 3, switch controller 330 is coupled to a GNSS receiver 350, an inertial reference system IRS 360 and a flight management system (FMS) 370. GNSS receiver 350 outputs position information to switch controller 330 based on satellite navigations signals. In alternate embodiments, GNSS receiver 350 comprises a receiver compatible with one or more satellite systems such as but not limited to GPS, Galileo, Compass or GLONASS. In one embodiment, IRS 360 comprises sets of accelerometers and gyroscopes that track changes in position and attitude. In the configuration of FIG. 3, IRS 360 provides its information to the controller 330. In the same manner as described above in FIG. 1, flight management system 370, tracks, plans and projects the flight path traveled by aircraft 10.

In one embodiment in operation, switch controller 330 obtains location and attitude information from GNSS receiver 350 and IRS 360 to determine the location and orientation of aircraft 10. Switch controller 330 also obtains a location of a particular GBAS navigation control station from Radio receiver 320 (which may retrieve the location from a memory 325 or obtain the location via a transmission from the control station). Switch controller 330 evaluates each aircraft antenna 311-1 to 311-n based on their respective antenna gain characteristics and pattern to determine which of antenna 311-1 to 311-n is most suitable for receiving signals from the GBAS navigation control station. Evaluation of the antenna selection is performed based on the current conditions as well as those predicted to exist at some number of time intervals in the future.

In one embodiment, knowledge regarding upcoming flight maneuvers is obtained by switch controller 330 through information received by Radio receiver 320 from a ground station transmitter. In other embodiments, knowledge regarding upcoming flight maneuvers is obtained by switch controller 330 from the flight management system 370. For example, in one embodiment, flight management system 370 communicates to switch controller 330 pilot instructions regarding speed and course of navigation, holding patterns, airport configurations and the like. Switch controller 330 receives this information from the flight management system 370 and therefore knows the trajectory a priori and can calculate the necessary vectors and select the best antenna for the aircraft over some future interval of time. For example, where aircraft 10's trajectory over the next 3 to 12 minutes of travel is known, switch controller 330 will calculate the line-of-site vectors based on one or more future predicted positions and orientations of the aircraft 10. This embodiment is desirable when the present aircraft position is quite different from the subsequent direction, such as when the aircraft will be making a sharp turn.

In one embodiment, switch controller 330 chooses the antenna 311-1 to 311-n that has the best predicted performance over some time duration. To minimize impact on operation, in one embodiment, the coupling of the Radio receiver 320 to a selected antenna is performed by the switch controller 330 only during a time period when there is no expected data reception. For example, in the GBAS system that uses time-division-multiplexing, there may be idle communication time slots or idle periods with respect to a particular aircraft, and the switching can be performed at that time.

Figure 4:
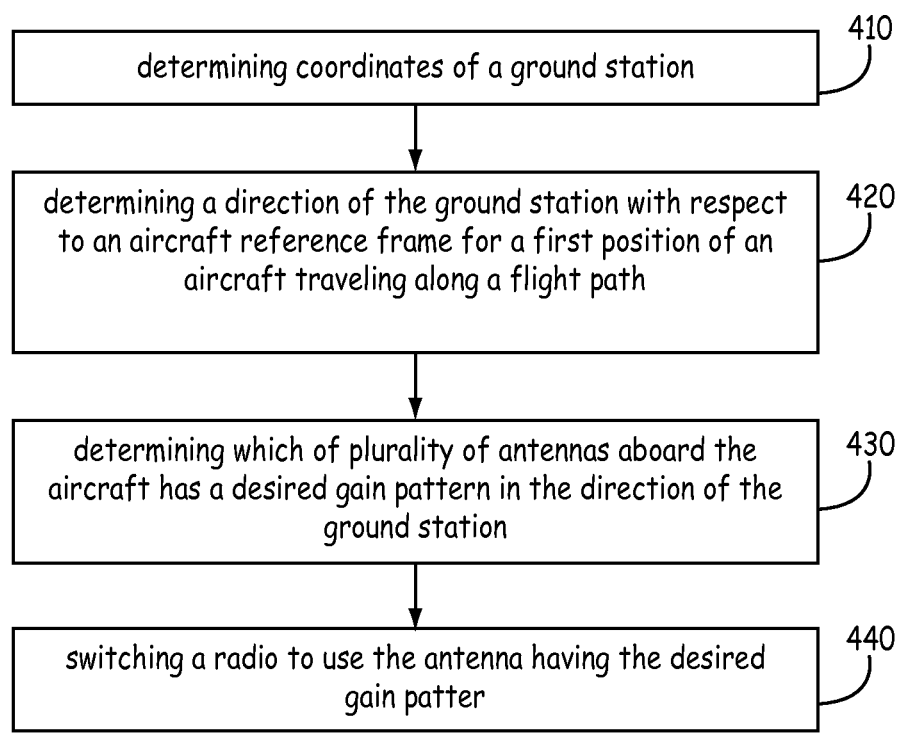
FIG. 4 is a flow chart illustrating a method of one embodiment of an antenna selector.

FIG. 4 is a flowchart illustrating a method 400 of one embodiment of an antenna selector. In one embodiment, the method is performed using a navigation receiver system such as described with respect to any of FIGS. 1-3 above. In other embodiments, other navigation receivers may be used.

The method begins at 410 with determining a position of a ground station transmitter. In one alternative, the ground station broadcasts its own position. For example, GBAS ground stations broadcast their own locations. An aircraft receiver, such as VDB receivers 160 or 320, will be tuned to the frequency of the transmission in order to receive the broadcast. In another alternative, the position of a ground station transmitter is determined by accessing on-board databases. For example, such a database may contain information such as frequencies used and longitude, latitude, and altitude of ground transmitters for the region in which the aircraft operates. In one embodiment, when aircraft 10 travels to within a preprogrammed distance (about 50 to 150 miles, for example) of a ground station transmitter, the method will look up the ground station transmitter from the database. Upon nearing the ground station, the aircraft 10 may then use the GBAS broadcasts from the airport and station that contain the transmitter coordinates.

The method proceeds to 420 with determining a direction of the ground station transmitter with respect to an aircraft based reference frame for a first position of the aircraft while traveling along a flight path. In one embodiment, the navigation system obtains the position of the aircraft based on satellite data, and obtains the attitude based on inertial data. Then navigation system then calculates a vector with respect to the aircraft's reference frame pointing from the aircraft to the ground station whose position was determined at block 410. For example, in FIG. 2B, at position 201, a vector drawn from the aircraft 10 to transmitter 80 would follow line 220. At a different position 202, a vector drawn from the aircraft 10 to transmitter 80 would follow line 222. In one embodiment, the direction of the ground station is determined for a projected position of the aircraft for some future point in time. For example, in one embodiment, determining a direction of the ground station transmitter includes determining a position of the aircraft both in the recent past as well as after one or more anticipated flight maneuvers are performed.

The method proceeds to 430 with selecting a first antenna from among of a plurality of onboard antenna for receiving navigation information from the ground station transmitter based on the direction of the ground station transmitter with respect to the aircraft based reference frame. In one embodiment, the navigation system selects the antenna that provides the higher gain. Using the direction of the ground station transmitter with respect to the aircraft based reference frame, the navigation system compares that information against the various antenna gain patterns. Whichever antenna has the higher gain-magnitude pattern in the particular direction of the ground station transmitter, then that antenna is selected.

In one embodiment, to choose the appropriate antenna, a processor analyzes the reception gain pattern of the various antennas mounted on the aircraft in conjunction with the current aircraft location, together with the attitude data and the location of the ground transmitter. The processor calculates the present position, knows the location of the transmitter, and receives the attitude data. With this set of information, the processor can calculate the trajectory and azimuth, and predict the future path of the aircraft over some period of time (i.e. minutes) and the predicted signal gain. The processor chooses the antenna that maximizes the signal gain. In other embodiments, the selection is based on a weighted combination of maximizing the signal gain and a predicted gain for a projected future aircraft position.

Then the method proceeds to 440 with switching to couple a receiver to use the selected antenna. For the reasons discussed above, the act of switching may result in a temporary loss of communication between a ground station and the onboard receiver as the electronics transition from one antenna to another. An overly-long dead time could mean a loss of important communication with the ground station or create errors in the calculations. Therefore, in one embodiment, the timing of switching accounts for considerations such as the communication time between the ground station and on-board receiver and the switching time needed to recouple the receiver to an antenna. In one embodiment, a VDB receiver indicates when switching should occur based on an established transmission schedule for the ground station. That is, although a processor determines the antenna selection, it passes its decision to the VDB receiver which will ascertain the best time during which the antenna switch from one antenna to the other should occur. The newly selected antenna signal then passes through the switch to the VDB receiver.

An illustrative example of implementing method 400 with the navigation receiver 100 is now described. For the purposes of this example, determining coordinates for a ground station (Block 410) is performed by having navigation receiver 100 tune to a GBAS ground station. The navigation receiver 100 may initially select the VOR antenna 20 for VDB reception. After the navigation receiver 100a acquires the VDB signal, it begins receiving and decoding the ground station data.

Proceeding to block 420, the navigation receiver 100 makes a prediction of the location of a VDB transmitter antenna (at transmitters 80 or 90, for example) using the data from the VDB ground station associated with transmitters 80 or 90. Navigation receiver 100 uses an internally computed position of the aircraft 10, along with the aircraft attitude measurements by the IRS 60 to compute a bearing to the ground station 80 or 90. Because the aircraft 10 is traveling and because the instruments may take measurements in units in other coordinate systems, processor 170 will map the measurements from the various sources into a single reference frame under which the antenna gain patterns such as 25 and 35 have been mapped. To simplify the computation in the processor 170, a number of transformations may be utilized to go from, for example, an ECEF (Earth Centered, Earth Fixed coordinates) to the aircraft 10 body frame. For instance, initially, the aircraft 10 position and a line of sight vector from the aircraft 10 to the ground station 80 or 90 may all be computed in the ECEF coordinates. Then, the relative line of sight vector is eventually rotated into the aircraft 10 body frame.

In one embodiment, the navigation receiver 100 keeps in memory 125 a history of the calculated bearings to the ground station 80 or 90. The processor 170 also predicts aircraft 10's position into the future based on the aircraft's flight plan and the information that the IRS 60 provided to navigation receiver 100. In one embodiment, processor 170 further predicts the one or more future bearings (that is, line of sight vectors) to the ground station 80 or 90.

Performing block 430, navigation receiver 100 determines a desirability (decision) metric for each ground station antenna 80 or 90 and each computed bearing to 80 or 90. Calculation of the desirability metric may take into account one or more historical bearing calculations, present bearing calculations and predicted future bearing calculations. Then based on the reception gain patterns of the ILS localizer antenna 30 and the VOR antenna 20, processor 170 computes desirability metrics for each antenna and chooses the antenna with the best desirability metric. The best desirability metric is based on whichever is the larger gain reception pattern associated with either the directional ILS localizer antenna 30, the VOR antenna 20, or optionally another antenna such described with respect to multiple antenna system shown in FIG. 3. In one implementation, the best desirability metric also accounts for a brief span or segment of the aircraft's trajectory and is a weighted sum of the largest gain for each of the bearings during the segment of the trajectory. For example, suppose there are 11 bearings, 5 in the past, 1 in the present, and 5 in the future. For each of the 11 bearings, an individual desirability metric is computed and each individual desirability metric is multiplied by some weight factor. Then each of these products is summed to yield the value for the best desirability metric to select an antenna. In one embodiment, the weight factors are chosen based on experimental data to yield the most-often correct results, but the particular individual desirability metric for the present bearing is often given the most weight. In a different embodiment, there are more past bearings than future bearings that are taken into consideration or given more weight, and vice versa. In yet another embodiment, there may be no consideration for future bearings altogether (i.e. the weight is zero).

At block 440, navigation receiver 100 will switch RF switch 110 to the antenna with the best desirability metric based on the trajectory history, on the antenna gain patterns that are measured through flight tests, and also optionally on the future trajectory. In an embodiment where the desirability metric also includes the calculated future bearing of the aircraft 10 with respect to ground stations 80 or 90, the "future" takes into consideration only a few to several minutes because the aircraft 10 is traveling fairly fast. The future bearing of the aircraft 10 may be important if the aircraft 10 is banking acutely or changing course. In contrast to this time duration, the time it takes to switch to another antenna is relatively fast, such as on the order of milliseconds. Thus, it is possible to switch the antenna multiple times while the aircraft 10 is turning acutely. The processor 170 selects the desired antenna in such a manner so as not to interrupt the incoming VDB signal stream. This is accomplished by switching during a period of time when the VDB is not transmitting. For example, where VDB transmissions are scheduled to occur during predefined time slot, switching will occur during an unoccupied slot. When it is suitable to switch, processor 170 drives the RF switch 110 to channel the signals from the selected antenna to the VDB receiver 160 as necessary. If the desired antenna turns out to be the currently-selected antenna, it would be unnecessary further realign RF switch 110. This process of monitoring the signals and computing the bearing and selecting the antenna may be repeated continuously.

Figure 5:
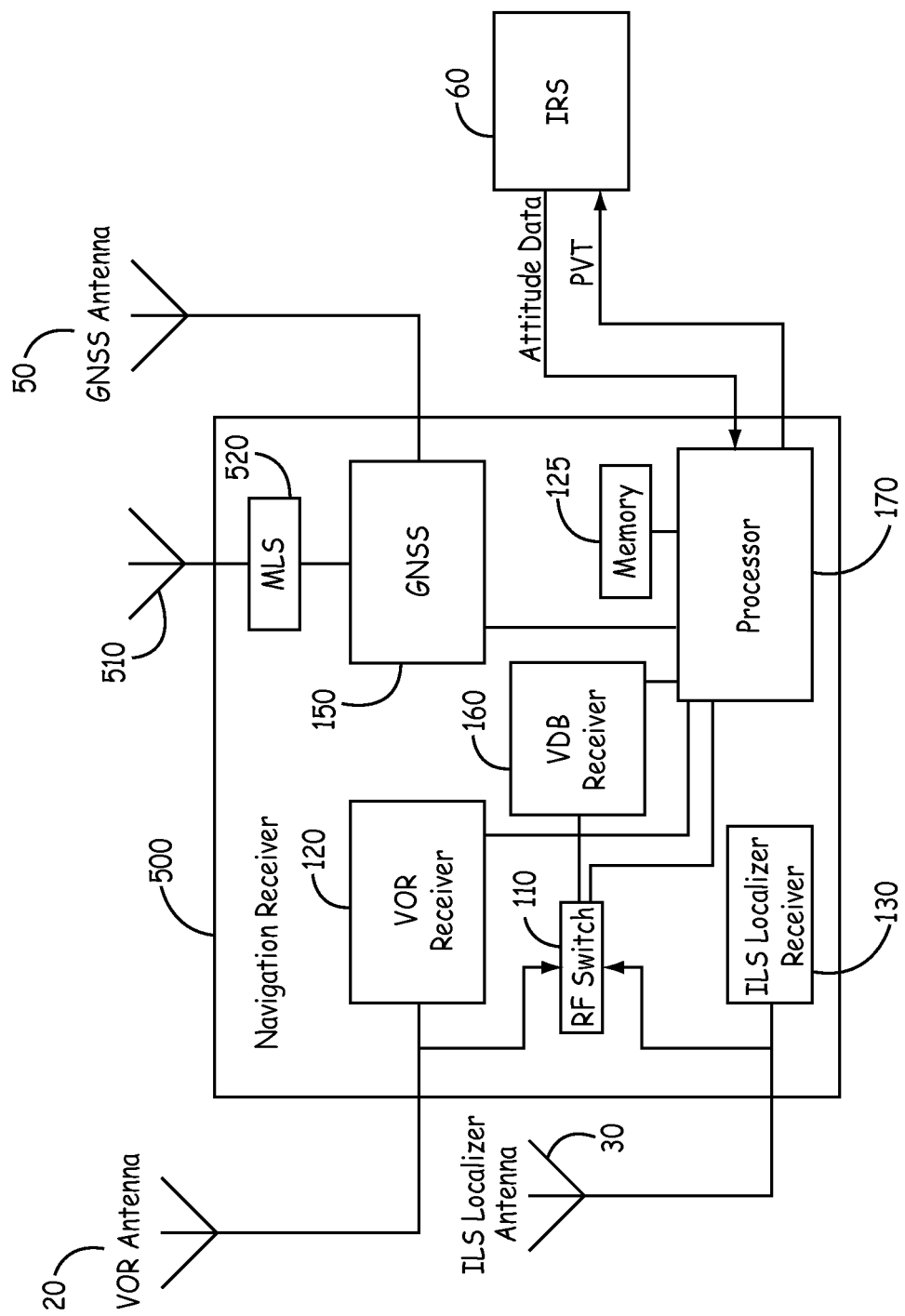
FIG. 5 is a block diagram illustrating another embodiment of an antenna selector.

FIG. 5 is a block diagram illustrating an on-board navigation receiver 500 of one embodiment of an antenna selector. Like numbered elements operate the same as described above with respect to FIG. 1. In the embodiment of FIG. 5, navigation receiver 500 is coupled to a VOR antenna 20, an ILS localizer antenna 30, and a GNSS antenna 50 and an optional microwave landing system (MSL) antenna 510 for communicating with an MLS system (which is used in some countries and airports). A typical MLS system employs two narrow microwave beams, which perform a vertical and horizontal scanning in the direction of a landing strip. The two beams help determine the position of an aircraft in vertical and horizontal planes, and the position information enables pilots or ground control to guide the landing of an aircraft. MSL antenna 510 employs one or more phased array scanning beam antennas tuned to the microwave frequencies of the two narrow microwave beams. Signals received by MSL antenna 510 are analyzed by processor 170 along with the VHF signals from the VOR and LOC antennas 20 and 30. In one such embodiment, switching between use of signals received by the antennas 20 and 30, as well as antenna 510 is performed based on the relative gain of the antennas. Because they operate at different frequencies, if traffic or weather conditions reduce the signal amplitude at the microwave frequency, they may not affect the VHF frequencies, and vice versa. As shown in FIG. 5, the navigation receiver 500 includes an MLS module 520 that converts the received signals to be compatible with the GBAS VDB receiver 160. Processor 170 may then pass the relevant information received via antenna 510 to VDB receiver 160 when it calculates a set of desirability metrics that indicates that antenna 510 has the best overall desirability metric. As described above, the best overall desirability metric is based on whichever is the larger gain reception pattern associated with either the directional ILS localizer antenna 30 or the omnidirectional VOR antenna 20, or optionally the other antennas such as the MLS antenna 510.

In order to be compatible with existing navigation electronics and/or to reduce costs in modifying the existing navigation systems, the aircraft 10 can still use the existing electronics to switch among different operation modes, ILS or GLS or MLS or so on. For instance, the processor 170 can be re-programmed with an additional software instruction code to control the switching of the antennas, or another processor can be tasked to perform the functions for GBAS mode. While not in GLS/GBAS mode, the processor 170 or some other processor can disable the antenna selection command and/or monitor the rest of the hardware for any failures in performing the lockout.

Example Embodiments

Example 1 includes a navigation receiver system for an aircraft comprising: a first aircraft antenna that receives transmitter signals from fixed-location ground transmitters and a second aircraft antenna that receives transmitter signals from the fixed-location ground transmitters, wherein the first aircraft antenna has a first gain pattern that is different from a second gain pattern of the second aircraft antenna; a switch coupled to a first receiver and coupled to the first aircraft antenna and the second aircraft antenna; and a switch controller coupled to the switch, wherein the switch controller operates the switch to electrically couple the first receiver to either the first aircraft antenna or the second aircraft antenna based on a determination of whether the first gain pattern or the second gain pattern provides higher gain in a direction of a first fixed-location ground transmitter of the fixed-location ground transmitters.

Example 2 includes the system of example 1, wherein the determination of whether the first gain pattern or the second gain pattern provides higher gain in the direction of the first fixed-location ground transmitter is made based on an orientation of the aircraft relative to the first fixed-location ground transmitter as determined at least in part from position information for the aircraft and attitude information for the aircraft.

Example 3 includes any of the above examples 1-2, further comprising: a global navigation satellite system (GNSS) that outputs the position information for the aircraft; and an inertial reference system that outputs the attitude information for the aircraft.

Example 4 includes any of the above examples 1-3 wherein the determination includes a calculation of a vector between the aircraft a first fixed-location ground transmitter, and a rotation of the vector into a frame of reference in which the first and second gain patterns are mapped.

Example 5 includes any of the above examples 1-4 further comprising a memory storing a database of coordinates that includes location coordinates of the first fixed-location ground transmitter, wherein the navigation receiver further reads the location coordinates from the database of coordinates to determine the orientation of the aircraft relative to the first fixed-location ground transmitter.

Example 6 includes any of the above examples 1-5 wherein the first radio receiver is reconfigurable to operate as either an Instrument Landing System (ILS) localizer receiver or a VHF Data Broadcast (VDB) receiver.

Example 7 includes any of the above examples 1-6 wherein the individual desirability metrics are calculated by the switch controller based on calculation of bearings between the aircraft and the first fixed-location ground transmitter, the calculation of bearings including one or more of historical bearing calculations, present bearing calculations and predicted future bearing calculations.

Example 8 includes any of the above examples 1-7 wherein the first receiver is compatible with a Ground-Based Augmentation System (GBAS) system and an ILS system; wherein the first receiver receives location coordinates for the first fixed-location ground transmitter from a signal transmitted by the first fixed-location ground transmitter; and wherein the orientation of the aircraft relative to the first fixed-location ground transmitter is determined based on the location coordinates.

Example 9 includes any of the above examples 1-8 wherein the navigation system is an integrated system further comprising: a VHF omnidirectional radio (VOR) receiver, wherein the first aircraft antenna comprises a VOR antenna direct-coupled to the VOR receiver; and an Instrument Landing System (ILS) localizer receiver, wherein the second aircraft antenna comprises an ILS localizer antenna direct-coupled to the ILS localizer receiver; wherein the first radio receiver comprises a VHF Data Broadcast (VDB) receiver that is Ground-Based Augmentation System (GBAS) compatible; and wherein the VOR antenna and the ILS localizer antenna are switchably coupled to the VDB receiver via the switch.

Example 10 includes a navigation receiver system for an aircraft, the system comprising: an RF switch coupled to a plurality of aircraft antennas that receive signals from fixed-location ground transmitters; a receiver coupled to the RF switch; and a processor coupled to the receiver and the RF switch, the processor operating the RF switch to couple one of the plurality of aircraft antennas to the receiver based on calculating an orientation of the aircraft with respect to a direction of one of the fixed-location ground transmitters and respective gain patterns for each of the plurality of aircraft antennas.

Example 11 includes example 10, wherein to select the one of the plurality of aircraft antennas, the processor calculates at least one bearing of the aircraft with respect to the one of the fixed-location ground transmitters and calculates an individual desirability metric for each of the plurality of aircraft antennas based on the at least one bearing from which the processor selects a best desirability metric.

Example 12 includes any of the above examples 10-11 further comprising: a global navigation satellite system (GNSS) receiver coupled to the processor, and an inertial reference system (IRS) coupled to the processor; wherein the GNSS receiver provides to the processor a position of the aircraft and the IRS provides to the processor an attitude measurement of the aircraft.

Example 13 includes any of the above examples 10-12 wherein the receiver is a VHF Data Broadcast (VDB) receiver.

Example 14 includes any of the above examples 10-13 wherein the processor includes future trajectory information of the aircraft for calculating the orientation of the aircraft with respect to a direction of one of the fixed-location ground transmitters.

Example 15 includes any of the above examples 10-14 wherein individual desirability metrics are calculated by the switch controller for each of the plurality of aircraft antennas based on calculation of bearings between the aircraft and the one fixed-location ground transmitter, the calculation of bearings including one or more of historical bearing calculations, present bearing calculations and predicted future bearing calculations.

Example 16 includes an aircraft navigation method, the method comprising: determining coordinates of a ground station; determining a direction of the ground station with respect to an aircraft reference frame for a first position of an aircraft traveling along a flight path; determining which of a plurality of antennas aboard the aircraft has a desired gain pattern in the direction of the ground station; and switching a radio to use the antenna having the desired gain pattern.

Example 17 includes example 16, wherein determining which of a plurality of antennas aboard the aircraft has a desired gain pattern in the direction of the ground station further comprises: calculating individual desirability metrics for each of the plurality of aircraft antennas based on calculation of bearings between the aircraft and the one fixed-location ground transmitter, and based on reception gain patterns for each of the plurality of antennas, the calculation of bearings including one or more of historical bearing calculations, present bearing calculations and predicted future bearing calculations; and selecting a best desirability metric from the individual desirability metrics.

Example 18 includes any of the above examples 16-17 wherein determining coordinates of a ground station further comprises either: receiving location coordinates for the ground station from via a transmission broadcast, or retrieving the location coordinates from a database.

Example 19 includes any of the above examples 16-18 wherein determining a direction of the ground station with respect to an aircraft reference frame for a first position of an aircraft traveling along a flight path further comprises determining a position of an aircraft at one or more future points in time along a planned flight path.

Example 20 includes any of the above examples 16-19 wherein the plurality of antennas aboard the aircraft include at least one VHF omnidirectional radio (VOR) antenna and at least one Instrument Landing System localizer (ILS LOC) antenna, and the radio comprises a Ground-Based Augmentation System (GBAS) receiver.

For any of the embodiments described in this specification, the navigation receiver systems may be freely allowed to select and switch to a desired antenna strictly based on its own internal decision processes. Optionally, in other situations such as during an emergency, the ability of a navigation receiver system to switch between antennas may be governed by external constraints.

Several hardware electronics are available to implement the navigation systems and methods of the various embodiments as discussed in this specification. Such hardware includes, but are not limited to, digital computer systems, microprocessors, general purpose computers, programmable controllers and field programmable gate arrays, and microcontroller circuits. Therefore additional embodiments of the present invention include program instructions resident on non-transient computer readable storage media which when implemented by such devices, enable them to implement embodiments of the present invention. Computer readable storage media include any form of physical computer data storage hardware, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other non-transient form of permanent, semi-permanent, or temporary memory storage system or device. Program instructions and code include, but are not limited to computer-executable instructions executed by computer system processors and hardware description languages such as Very High Speed Integrated Circuit (VHSIC) Hardware Description Language (VHDL) or Verilog code.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A navigation receiver system for an aircraft, the system comprising:
    a first aircraft antenna that receives transmitter signals from fixed-location ground transmitters and a second aircraft antenna that receives transmitter signals from the fixed-location ground transmitters, wherein the first aircraft antenna has a first gain pattern that is simultaneously different from a second gain pattern of the second aircraft antenna, wherein the first aircraft antenna and the second aircraft antenna are physically distinct;
    a switch coupled to a first receiver and coupled to the first aircraft antenna and the second aircraft antenna; and
    a switch controller coupled to the switch, wherein the switch controller operates the switch to electrically couple the first receiver to either the first aircraft antenna or the second aircraft antenna based on a determination of whether the first gain pattern or the second gain pattern provides higher gain in a direction of a first fixed-location ground transmitter of the fixed-location ground transmitters,
    wherein the determination of whether the first gain pattern or the second gain pattern provides higher gain in the direction of the first fixed-location ground transmitter is made based on an orientation of the aircraft relative to the first fixed-location ground transmitter as determined at least in part from position information for the aircraft and attitude information for the aircraft, and
    wherein the determination includes a calculation of a vector between the aircraft and the first fixed-location ground transmitter, and a rotation of the vector into a frame of reference in which the first and second gain patterns are mapped.

2. The system of claim 1, further comprising:
    a global navigation satellite system (GNSS) that outputs the position information for the aircraft; and
    an inertial reference system that outputs the attitude information for the aircraft.

3. The system of claim 1, further comprising a memory storing a database of coordinates that includes location coordinates of the first fixed-location ground transmitter, wherein the navigation receiver further reads the location coordinates from the database of coordinates to determine the orientation of the aircraft relative to the first fixed-location ground transmitter.

4. The system of claim 1, wherein the first receiver is reconfigurable to operate as either an Instrument Landing System (ILS) localizer receiver or a VHF Data Broadcast (VDB) receiver.

5. The system of claim 1, wherein individual desirability metrics are calculated by the switch controller based on a calculation of bearings between the aircraft and the first fixed-location ground transmitter, the calculation of bearings including one or more of historical bearing calculations, present bearing calculations and predicted future bearing calculations.

6. The system of claim 1, wherein the first receiver is compatible with a Ground-Based Augmentation System (GBAS) system and an ILS system;
wherein the first receiver receives location coordinates for the first fixed-location ground transmitter from a signal transmitted by the first fixed-location ground transmitter; and
wherein the orientation of the aircraft relative to the first fixed-location ground transmitter is determined based on the location coordinates.

7. The system of claim 1, wherein the navigation system is an integrated system further comprising:
a VHF omnidirectional radio (VOR) receiver, wherein the first aircraft antenna comprises a VOR antenna direct-coupled to the VOR receiver; and
an Instrument Landing System (ILS) localizer receiver, wherein the second aircraft antenna comprises an ILS localizer antenna direct-coupled to the ILS localizer receiver;
wherein the first receiver comprises a VHF Data Broadcast (VDB) receiver that is Ground-Based Augmentation System (GBAS) compatible; and
wherein the VOR antenna and the ILS localizer antenna are switchably coupled to the VDB receiver via the switch.

8. A navigation receiver system for an aircraft, the system comprising:
an RF switch coupled to a plurality of aircraft antennas that receive signals from fixed-location ground transmitters, wherein the aircraft antennas are physically distinct;
a receiver coupled to the RF switch; and
a processor coupled to the receiver and the RF switch, the processor operating the RF switch to couple one of the plurality of aircraft antennas to the receiver based on calculating an orientation of the aircraft with respect to a direction of one of the fixed-location ground transmitters and simultaneous respective gain patterns for each of the plurality of aircraft antennas,
wherein operating the RF switch is further based on determining which of the respective gain patterns of the plurality of aircraft antennas provides higher gain in the direction of the fixed-location ground transmitter as determined at least in part from position information for the aircraft and attitude information for the aircraft, and
wherein operating the RF switch is further based on calculating a vector between the aircraft and the fixed-location ground transmitter, and a rotation of the vector into a frame of reference in which the respective gain patterns are mapped.

9. The system of claim 8, wherein to couple the one of the plurality of aircraft antennas, the processor calculates at least one bearing of the aircraft with respect to the one of the fixed-location ground transmitters and calculates an individual desirability metric for each of the plurality of aircraft antennas based on the at least one bearing from which the processor selects a best desirability metric.

10. The system of claim 8 further comprising:
a global navigation satellite system (GNSS) receiver coupled to the processor, and
an inertial reference system (IRS) coupled to the processor;
wherein the GNSS receiver provides to the processor a position of the aircraft and the IRS provides to the processor an attitude measurement of the aircraft.

11. The system of claim 8, wherein the receiver is a VHF Data Broadcast (VDB) receiver.

12. The system of claim 8, wherein the processor includes future trajectory information of the aircraft for calculating the orientation of the aircraft with respect to a direction of one of the fixed-location ground transmitters.

13. The system of claim 8, wherein individual desirability metrics are calculated by the processor for each of the plurality of aircraft antennas based on a calculation of bearings between the aircraft and the one fixed-location ground transmitter, the calculation of bearings including one or more of historical bearing calculations, present bearing calculations and predicted future bearing calculations.

14. An aircraft navigation method, the method comprising:
determining coordinates of a ground station;
determining a direction of the ground station with respect to an aircraft reference frame for a first position of an aircraft traveling along a flight path;
determining which of a plurality of antennas aboard the aircraft has a desired gain pattern in the direction of the ground station, wherein the antennas are physically distinct and simultaneously receiving, wherein determining which of the plurality of antennas aboard the aircraft has a desired gain pattern in the direction of the ground station is based on an orientation of the aircraft relative to the ground station as determined at least in part from position information for the aircraft and attitude information for the aircraft, wherein determining which of the plurality of antennas aboard the aircraft has a desired gain pattern in the direction of the ground station includes calculating a vector between the aircraft and the ground station, and a rotation of the vector into a frame of reference in which gain patterns of the plurality of antennas are mapped; and
switching a radio to use the antenna having the desired gain pattern.

15. The method of claim 14, wherein determining which of a plurality of antennas aboard the aircraft has a desired gain pattern in the direction of the ground station further comprises:
calculating individual desirability metrics for each of the plurality of aircraft antennas based on a calculation of bearings between the aircraft and the ground station, and based on reception gain patterns for each of the plurality of antennas, the calculation of bearings including one or more of historical bearing calculations, present bearing calculations and predicted future bearing calculations; and
selecting a best desirability metric from the individual desirability metrics.

16. The method of claim 14, wherein determining coordinates of a ground station further comprises either:
receiving location coordinates for the ground station from via a transmission broadcast, or
retrieving the location coordinates from a database.

17. The method of claim 14, wherein determining a direction of the ground station with respect to an aircraft reference frame for a first position of an aircraft traveling along a flight path further comprises determining a position of an aircraft at one or more future points in time along a planned flight path.

18. The method of claim 14, wherein the plurality of antennas aboard the aircraft include at least one VHF omnidirectional radio (VOR) antenna and at least one Instrument Landing System localizer (ILS LOC) antenna, and the radio comprises a Ground-Based Augmentation System (GBAS) receiver.

* * * * *